Oct. 7, 1958     W. G. KRELLNER     2,855,528
SILICONE INSULATED DYNAMOELECTRIC MACHINE
Filed Oct. 18, 1954
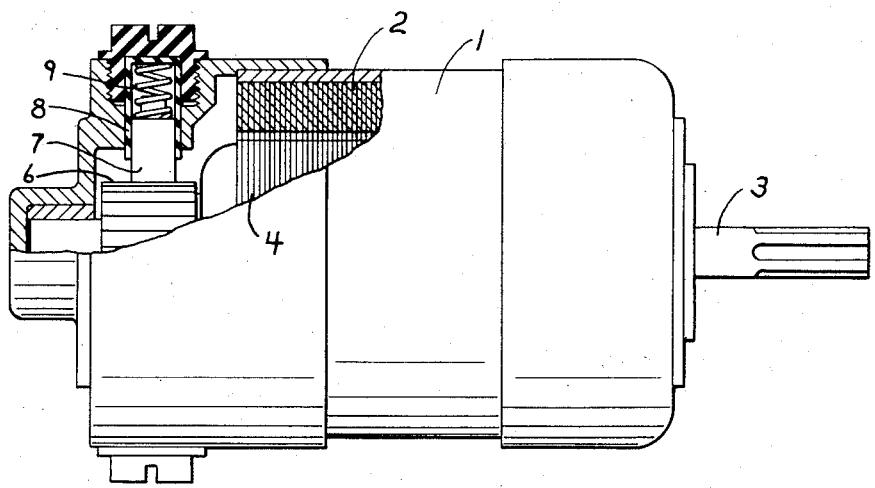
INVENTOR.
WALTER G. KRELLNER
BY
HIS ATTORNEY

2,855,528

SILICONE INSULATED DYNAMOELECTRIC MACHINE

Walter G. Krellner, St. Marys, Pa., assignor to Stackpole Carbon Company, St. Marys, Pa., a corporation of Pennsylvania Application October 18, 1954, Serial No. 462,867

2 Claims. (Cl. 310—228)

This invention relates to dynamoelectric machines in which there is silicone insulation, and more particularly to such machines which are enclosed.

To increase the rating of dynamoelectric machines, such as motors and generators, silicone has been used as insulation for the coils and other internal wiring because it will withstand high temperatures. As long as such machines have open ventilation they operate satisfactorily and in the manner to be expected. On the other hand, when the machines are enclosed, by which is meant that their housings are sealed or the machines have a closed system of ventilation, it has been found that the brushes wear away very rapidly. Also, the dusting of the carbon brushes fills the machine with carbon dust that reduces the effectiveness of the insulation. The reason for the rapid wearing of carbon brushes in enclosed dynamoelectric machines using silicone insulation appears to be that the high operating temperatures cause the silicone to decompose slowly and produce volatile vapors. Since the vapors can not escape, they are absorbed momentarily on the commutator or slip ring, where, in the presence of oxygen and the passage of current between the brush and the metal surface sliding against it, they form silica or a siliceous residue. The film that is thus formed acts as an insulator, through which arcing breaks and roughens the commutator or ring. The roughened metal surface and the sparking under the brush wear away the brushes very rapidly.

Regardless of the cause of the brush wear, however, it is a fact that rapid wear occurs when the silicone insulated electrical machine is enclosed. Many investigators have attempted to find a solution to the problem. The supposition has been that the insulating films can be removed from the commutators or slip rings only by actual wear, so in some cases brushes with added abrasive have been used, but without much success in prolonging brush life. One company stopped rapid brush wear by sealing the commutator and brushes in a separate pressurized chamber free of silicone atmosphere. Another absorbs the silicone vapors in charcoal or alumina filters. Neither of these solutions is entirely satisfactory because of the added space, weight and expense.

It is among the objects of this invention to provide an enclosed silicone-insulated dynamoelectric machine, in which the silicone atmosphere does not form an insulating film on the commutator or slip ring even though they are exposed to the atmosphere, in which filters or abrasive brushes are not used, and in which the brushes have the normal long life of open ventilated machines.

In accordance with this invention, the enclosed machine, the operation of which produces a silicone atmosphere inside of it, also contains one or more treated brushes in sliding contact with the metal surface of the commutator or slip ring. The treated brushes have porous carbon bodies containing a metallic fluoride impregnant or compound containing available fluorine, which reacts with the siliceous residue in the film to form volatile silicon fluoride. The silicon fluoride is a stable compound, and siliceous matter will not be deposited on the metal surface to cause rapid wear of the brushes.

The invention is illustrated in the accompanying drawings, which shows a side view of an enclosed dynamoelectric machine, such as an electric generator, with part of it broken away in section to show one of the two brushes.

Referring to the drawing, the dynamoelectric machine, such as a generator, has an outer casing 1 supporting a stator 2. Mounted on a drive shaft 3 inside of the stator is a rotor 4 having the customary windings for carrying electrical current. These windings are insulated with a silicone varnish. In order to conduct the electrical energy from the windings, the rotor carries a current collector, illustrated as consisting of a plurality of copper commutator segments 6. Electrical current from the current collector is taken off by means of carbon brushes disposed in sliding contact with the surface of the commutator. Each brush 7 is slidably mounted in a brush holder 8 and is pressed against the collector by a coil spring 9.

While the generator is operating, the heat produced vaporizes the silicone insulation slowly and, as the casing is sealed, the atmosphere is gradually contaminated with silicone decomposition products. It is a feature of this invention, however, that this atmosphere will not maintain a siliceous film on the commutator as in the past. This is because the brushes are treated in such a manner that a chemical reaction takes place with the silica, which tends to be formed by oxygen and the passage of electric current, to provide a stable vapor. Accordingly, the brushes are impregnated with a metallic fluoride which is available at the interface of the brush and the commutator and reacts with the silica to form silicon fluoride. Because the local conditions of sparking and high temperature promote the reaction, the silica or organo silicon oxide deposited in the film is rapidly converted into the fluoride, and the film is removed approximately as fast as it is formed. I have found that cadmium fluoride, lead fluoride, barium fluoride, silver fluoride and bismuth fluoride are the best metallic fluorides to use, and that of these cadmium fluoride appears to be superior. About 2% by weight of the metallic fluoride is sufficient to eliminate the rapid rate of brush wear.

The brush can be treated by impregnating it with the soluble salt and hydrofluoric acid. Another way is to impregnate the brush with a concentrated solution of water and cadmium fluoride under vacuum and pressure. After the brush has been dried out it can be given a second treatment if that appears to be desirable. Or, the brush can be impregnated with soluble lead salt and water and then the salt treated with hydrofluoric acid to convert it to lead fluoride. Brushes treated with these impregnants show the same rate of wear whether they are operated in normal atmosphere or one contaminated with the decomposition products of silicone resins. They show an advantage of the order of 10 to 1 over untreated brushes operating in a silicone atmosphere.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with an enclosed silicone-insulated dynamoelectric machine containing silicone atmosphere and a rotating member having a conducting metal surface that tends to acquire a film containing siliceous material, of a treated current-carrying brush in sliding contact with said metal surface and having a porous carbon body containing cadmium fluoride impregnant adapted to react with said siliceous material to form volatile silicon fluoride, whereby said surface is kept substantially free of siliceous material and brush wear is slow.

2. In the combination recited in claim 1, said cadmium fluoride forming approximately 2% by weight of the brush.

References Cited in the file of this patent

UNITED STATES PATENTS

| | | |
|---|---|---|
| 2,414,514 | Elsey | Jan. 21, 1947 |
| 2,465,296 | Swiss | Mar. 22, 1949 |
| 2,488,387 | Elsey | Nov. 15, 1949 |
| 2,501,321 | Elsey | Mar. 21, 1950 |
| 2,512,362 | Moberly | June 20, 1950 |

FOREIGN PATENTS

| | | |
|---|---|---|
| 646,579 | Great Britain | Nov. 22, 1950 |